United States Patent
Hamanaka et al.

(10) Patent No.: US 9,000,693 B2
(45) Date of Patent: Apr. 7, 2015

(54) FAILURE INFORMATION TRANSMISSION APPARATUS

(75) Inventors: Yoshiyuki Hamanaka, Kariya (JP); Tsuneo Maebara, Nagoya (JP)

(73) Assignee: Denso Corporation, Kariya (JP)

( * ) Notice: Subject to any disclaimer, the term of this patent is extended or adjusted under 35 U.S.C. 154(b) by 411 days.

(21) Appl. No.: 13/404,338

(22) Filed: Feb. 24, 2012

(65) Prior Publication Data

US 2012/0217906 A1 Aug. 30, 2012

(30) Foreign Application Priority Data

Feb. 25, 2011 (JP) ................................ 2011-040184

(51) Int. Cl.
| | |
|---|---|
| H02P 1/00 | (2006.01) |
| H02H 3/08 | (2006.01) |
| H04L 27/28 | (2006.01) |
| B60L 3/00 | (2006.01) |

(52) U.S. Cl.
CPC ............... B60L 3/003 (2013.01); B60L 3/0038 (2013.01); B60L 3/0084 (2013.01); B60L 2240/525 (2013.01); B60L 2240/527 (2013.01)

(58) Field of Classification Search
CPC . Y02T 10/7005; Y02T 10/7077; Y02T 10/70; B60W 10/08
USPC ............................ 318/139; 375/260; 361/93.1
See application file for complete search history.

(56) References Cited

U.S. PATENT DOCUMENTS

| | | | |
|---|---|---|---|
| 7,741,960 B1 * | 6/2010 | Hoogenakker et al. ........ | 340/431 |
| 8,027,132 B2 * | 9/2011 | Omaru .......................... | 361/93.1 |
| 2003/0155928 A1 | 8/2003 | Roden et al. | |
| 2006/0222345 A1 * | 10/2006 | Wood ............................ | 388/811 |
| 2009/0160476 A1 * | 6/2009 | Omaru .......................... | 324/765 |

FOREIGN PATENT DOCUMENTS

| | | |
|---|---|---|
| JP | 62-268769 | 11/1987 |
| JP | 2009-115825 | 5/2009 |
| JP | 2009-128563 | 6/2009 |
| JP | 2010-263712 | 11/2010 |

OTHER PUBLICATIONS

Office Action (2 pages) dated Oct. 10, 2013, issued in corresponding Japanese Application No. 2011-040184 and English translation (1 page).
Office Action (2 pages) dated Apr. 9, 2013, issued in corresponding Japanese Application No. 2011-040184 and English translation (2 pages).

* cited by examiner

*Primary Examiner* — Eduardo Colon Santana
*Assistant Examiner* — Gabriel Agared
(74) *Attorney, Agent, or Firm* — Nixon & Vanderhye PC (57) ABSTRACT

A failure information transmission apparatus includes a transmission circuit and a reception circuit. The transmission circuit transmits a plurality of pieces of failure information related to a plurality of failures as pulse signals different from one another via the same transmission path. The reception circuit receives the pulse signals transmitted by the transmission circuit via the same transmission path and identifies the failure information based on the pulse signal received. If the plurality of failures occurs at the same time, the transmission circuit transmits preferentially transmits failure information with higher priority of transmission.

8 Claims, 6 Drawing Sheets

| FAILURE INFORMATION | PRIORITY OF TRANSMISSION | PULSE SIGNALS RELATED TO FAILURE INFORMATION |
|---|---|---|
| SHORT-CIRCUIT OF IGBT 110a | HIGH ↕ LOW | PULSE SIGNAL WITH HIGH FREQUENCY ↕ PULSE SIGNAL WITH LOW FREQUENCY |
| OVERHEAT OF IGBT 110a | | |
| OVERHEAT OF IC | | |
| FAILURE OF ON-DRIVE FET 121a | | |
| VOLTAGE ABNORMALITY OF DRIVE POWER SUPPLY CIRCUIT 120 | | |
| VOLTAGE ABNORMALITY OF POWER SUPPLY CIRCUIT | | |

FIG.4

| FAILURE INFORMATION | PRIORITY OF TRANSMISSION | PULSE SIGNALS RELATED TO FAILURE INFORMATION |
|---|---|---|
| SHORT-CIRCUIT OF IGBT 110a | HIGH ⇕ LOW | PULSE SIGNAL WITH SMALL PULSE NUMBER ⇕ PULSE SIGNAL WITH LARGE PULSE NUMBER |
| OVERHEAT OF IGBT 110a | | |
| OVERHEAT OF IC | | |
| FAILURE OF ON-DRIVE FET 121a | | |
| VOLTAGE ABNORMALITY OF DRIVE POWER SUPPLY CIRCUIT 120 | | |
| VOLTAGE ABNORMALITY OF POWER SUPPLY CIRCUIT | | |

FIG.5

| FAILURE INFORMATION | PRIORITY OF TRANSMISSION | PULSE SIGNALS RELATED TO FAILURE INFORMATION |
|---|---|---|
| SHORT-CIRCUIT OF IGBT 110a | HIGH ⇕ LOW | PULSE SIGNAL WITH NARROW PULSE WIDTH ⇕ PULSE SIGNAL WITH WIDE PULSE WIDTH |
| OVERHEAT OF IGBT 110a | | |
| OVERHEAT OF IC | | |
| FAILURE OF ON-DRIVE FET 121a | | |
| VOLTAGE ABNORMALITY OF DRIVE POWER SUPPLY CIRCUIT 120 | | |
| VOLTAGE ABNORMALITY OF POWER SUPPLY CIRCUIT | | |

FIG. 6

| FAILURE INFORMATION | PRIORITY OF TRANSMISSION | PULSE SIGNALS RELATED TO FAILURE INFORMATION |
|---|---|---|
| SHORT-CIRCUIT OF IGBT 110a | HIGH ⇕ LOW | PULSE SIGNAL WITH NARROW PULSE WIDTH ⇕ PULSE SIGNAL WITH WIDE PULSE WIDTH |
| OVERHEAT OF IGBT 110a | | |
| OVERHEAT OF IC | | |
| FAILURE OF ON-DRIVE FET 121a | | |
| VOLTAGE ABNORMALITY OF DRIVE POWER SUPPLY CIRCUIT 120 | | |
| VOLTAGE ABNORMALITY OF POWER SUPPLY CIRCUIT | | |

FAILURE INFORMATION TRANSMISSION APPARATUS

CROSS-REFERENCE TO RELATED APPLICATION

This application is based on and claims the benefit of priority from earlier Japanese Patent Application No. 2011-040184 filed Feb. 25, 2011, the description of which is incorporated herein by reference.

BACKGROUND OF THE INVENTION

1. Technical Field of the Invention

The present invention relates to a failure information transmission apparatus that transmits a plurality of pieces of failure information related to a plurality of failures.

2. Related Art

As a failure information transmission apparatus that transmits failure information, for example, JP-A-2009-115825 discloses a motor control apparatus.

The motor control apparatus includes an inverter, a ground-fault detection device, and a controller. The ground-fault detection device detects a state of ground failure in the motor control apparatus and outputs its failure signal to the controller. In response to the failure signal, the controller disables operation of the inverter and interrupts electrical power supply to a motor. This enables damage to a circuit, etc., of the apparatus to be reduced.

In the motor control apparatus, various failures other than the ground failure are also detected in order to prevent the circuit, etc., from being damaged. When a plurality of pieces of failure information is received, the controller executes an appropriate process depending on the plurality of pieces of failure information. However, in order for the controller to receive each piece of failure information individually, the equipment configuration may be complicated. As a countermeasure against this, such a configuration that sequentially receives each of pieces of failure information via one transmission path to the controller may be considered. In this case, if a plurality of failures occurs at the same time, transmission of each of the plurality of pieces of failure information may be delayed. This cannot reduce the damage to the circuit, etc., of the apparatus.

SUMMARY

The present disclosure has been made in light of the problems set forth above and provides a failure information transmission apparatus capable of properly transmitting a plurality of pieces of failure information with a simple configuration.

As a result of devoting efforts to a study of solving the problems through a process of trial and error, the inventors have found that, if a plurality of pieces of failure information is transmitted as pulse signals different from one another, and if failure information with high priority of transmission is preferentially transmitted, the plurality of pieces of failure information can be properly transmitted with a simple configuration, and then have come to complete the present disclosure.

According to an exemplary aspect of the present disclosure, there is provided a failure information transmission apparatus, comprising: a transmission circuit that transmits a plurality of pieces of failure information related to a plurality of failures as pulse signals different from one another via the same transmission path; and a reception circuit that receives the pulse signals transmitted by the transmission circuit via the same transmission path and identifies the failure information based on the pulse signal received, wherein the transmission circuit transmits preferentially transmits failure information with higher priority of transmission (i.e., in descending order of priority of transmission), if the plurality of failures at the same time. This enables the plurality of pieces of failure information to be properly transmitted with a simple configuration.

In the failure information transmission apparatus, the transmission circuit may transmit the plurality of pieces of failure information as pulse signals different in frequency from one another. This enables the plurality of pieces of failure information to be transmitted as pulse signals different from one another.

In the failure information transmission apparatus, the transmission circuit may transmit the plurality of pieces of failure information as pulse signals which become higher in frequency as priority of transmission becomes higher. This enables the failure information with high priority of transmission to be more quickly transmitted.

In the failure information transmission apparatus, the transmission circuit may transmit the plurality of pieces of failure information as pulse signals different in the number of pulses from one another. This enables the plurality of pieces of failure information to be transmitted as pulse signals different from one another.

In the failure information transmission apparatus, the transmission circuit may transmit the plurality of pieces of failure information as pulse signals which become smaller in the number of pulses as priority of transmission becomes higher. This enables the failure information with high priority of transmission to be more quickly transmitted.

In the failure information transmission apparatus, the transmission circuit may transmit the plurality of pieces of failure information as pulse signals different in pulse width from one another. This enables the plurality of pieces of failure information to be transmitted as pulse signals different from one another.

In the failure information transmission apparatus, the transmission circuit may transmit the plurality of pieces of failure information as pulse signals which become narrower in pulse width as priority of transmission becomes higher. This enables the failure information with high priority of transmission to be more quickly transmitted.

In the failure information transmission apparatus, the transmission circuit may transmit the pulse signals related to the plurality of failures at every predetermined time interval. This enables the pulse signals to be repeatedly identified, and then, the failure information can be certainly identified.

In the failure information transmission apparatus, the plurality of pieces of failure information may be information related to the plurality of failures that occur in a motor control apparatus. This enables the plurality of pieces of failure information to be properly transmitted with a simple configuration.

DETAILED DESCRIPTION OF THE PREFERRED EMBODIMENTS

Hereinafter, with reference to the drawings, exemplary embodiments of the present invention will be described. In the embodiments, a failure information transmission apparatus according to the present invention is applied to a motor control apparatus which is mounted on a vehicle and controls a motor for driving the vehicle.

(First Embodiment)

Figure 1:
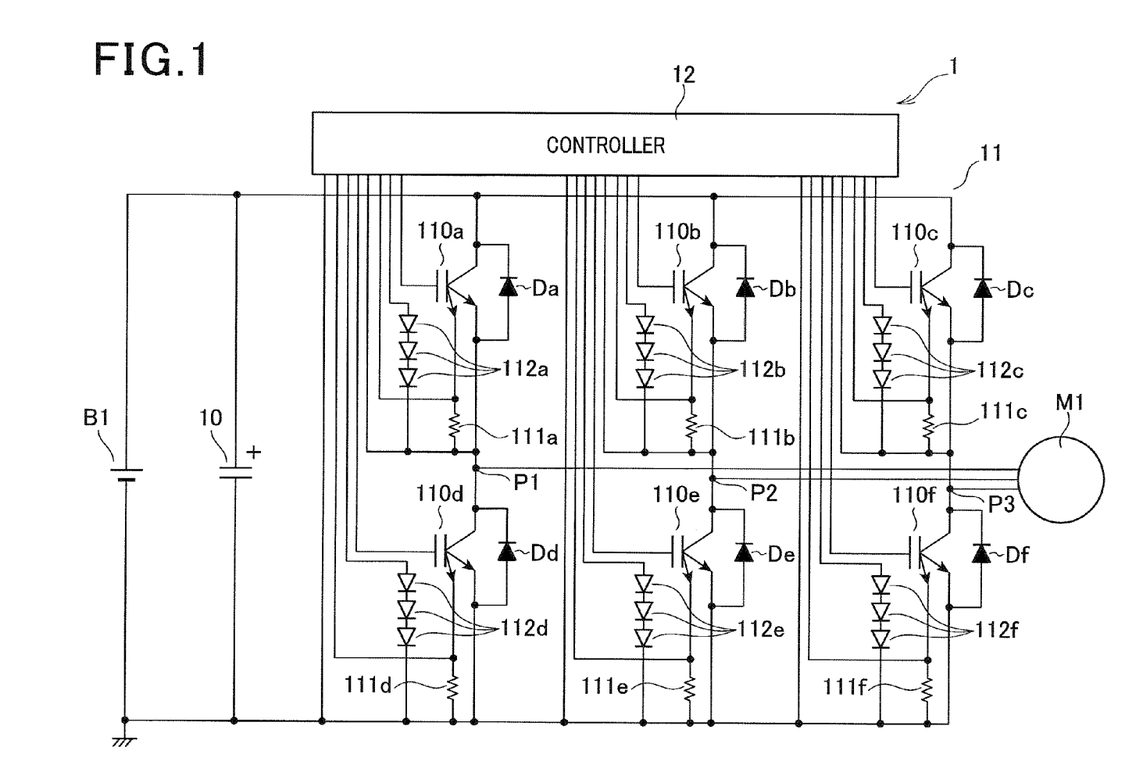
FIG. 1 is a circuit diagram of a configuration of a motor control apparatus to which a first embodiment of the present invention is applied.

With reference to FIG. 1, a configuration of a motor control apparatus according to a first embodiment of the present invention will be described below. FIG. 1 shows a circuit diagram of the motor control apparatus according to the first embodiment.

As shown in FIG. 1, a motor system for a vehicle includes a motor control apparatus (failure information transmission apparatus) 1 and a vehicle drive motor M1. The motor control apparatus 1 in FIG. 1 is an apparatus that converts a direct current (DC) high voltage (e.g., 288 Volts) outputted from a high voltage battery B1, which is insulated from a body of the vehicle, to a three-phase alternating current (AC) voltage, and supplies the three-phase AC voltage converted to the motor M1 in such a manner that the motor M1 is controlled. The motor control apparatus 1 includes a smoothing condenser 10, an inverter 11, and a controller 12.

The smoothing condenser 10 is an element that smoothes the DC high voltage from the high voltage battery B1. In both of ends of the smoothing condenser 10, one end is connected to a positive terminal of the high voltage battery B1, and the other end is connected to a negative terminal of the high voltage battery B1, which is connected to a ground for the high voltage battery B1 insulated from the body of the vehicle.

The inverter 11 is a device that converts the DC high voltage smoothed by the smoothing condenser 10 to the three-phase AC voltage and supplies the converted three-phase AC voltage to the vehicle drive motor M1. The inverter 11 includes insulated gate bipolar transistors (IGBTs) 110a to 110f, current sense resistors 111a to 111f, and temperature sensitive diodes 112a to 112f.

The IGBTs 110a to 110f are a switching element that is driven by a control of gate voltage and is turned on and off so that the DC high voltage smoothed by the smoothing condenser 10 is converted to the three-phase AC voltage. The IGBTs 110a to 110f have a current sense terminal where current that is proportional to and smaller than collector current. Both of the IGBTs 110a and 110d are connected in series to each other, both of the IGBTs 110b and 110e are connected in series to each other, and both of the IGBTs 110c and 110f are connected in series to each other. The emitters of the IGBTs 110a, 110b and 110c are connected to the collectors of the IGBT 110d, 110e and 110f. Three sets of series connections, i.e., the IGBTs 110a and 110d, the IGBTs 110b and 110e, and the IGBTs 110c and 110f are connected in parallel with one another. The collector of the respective IGBTs 110a to 110c is connected to one end of the smoothing condenser 10, and the emitter of the respective IGBTs 110d to 110f is connected to the other end of the smoothing condenser 10. The gate and emitter of the respective IGBTs 110a to 110f is connected to the controller 12. Three series connection points P1 to P3 between the IGBTs 110a and 110d, the IGBTs 110b and 110e, and the IGBTs 110c and 110f respectively are connected to the vehicle drive motor M1. In the respective IGBTs 110a to 110f, diodes (i.e., free wheel diodes) Da to Df are connected in anti-parallel, respectively.

The current sense resistors 111a to 111f are elements that convert current which flows in the IGBTs 110a to 110f to voltage, so that current which flows in the current sense terminals is converted to voltage. In the current sense resistors 111a to 111f, one end is connected to the respective current sense terminal of the IGBTs 110a to 110f, and the other end is connected to the respective emitter of the IGBTs 110a to 110f, and both ends are connected to the controller 12.

The temperature sensitive diodes 112a to 112f are an element that detects temperatures of the IGBTs 110a to 110f, and particularly output voltage based on temperature by applying constant current. The temperature sensitive diodes 112a to 112f are configured to be integrated with the IGBTs 110a to 110f, respectively, and have a plurality of diodes (e.g., three diodes in FIG. 1) that are connected in series to one another. In terminals (anode and cathode) at both ends of the temperature sensitive diodes 112a to 112f, which have the series connection respectively, the anode at one end is connected to the controller 12, and the cathode at the other end is connected to the respective emitter of the IGBTs 110a to 110f.

The controller 12 is a device that controls the IGBTs 110a to 110f. The controller 12 is connected to the gates and emitters of the IGBTs 110a to 110f. The controller 12 is connected to both ends of the current sense resistors 111a to 111f so as to detect current that flows in the IGBTs 110a to 110f, and is connected to the anode located at one end of the temperature sensitive diodes 112a to 112f so as to detect temperature of the IGBTs 110a to 110f.

Figure 2:
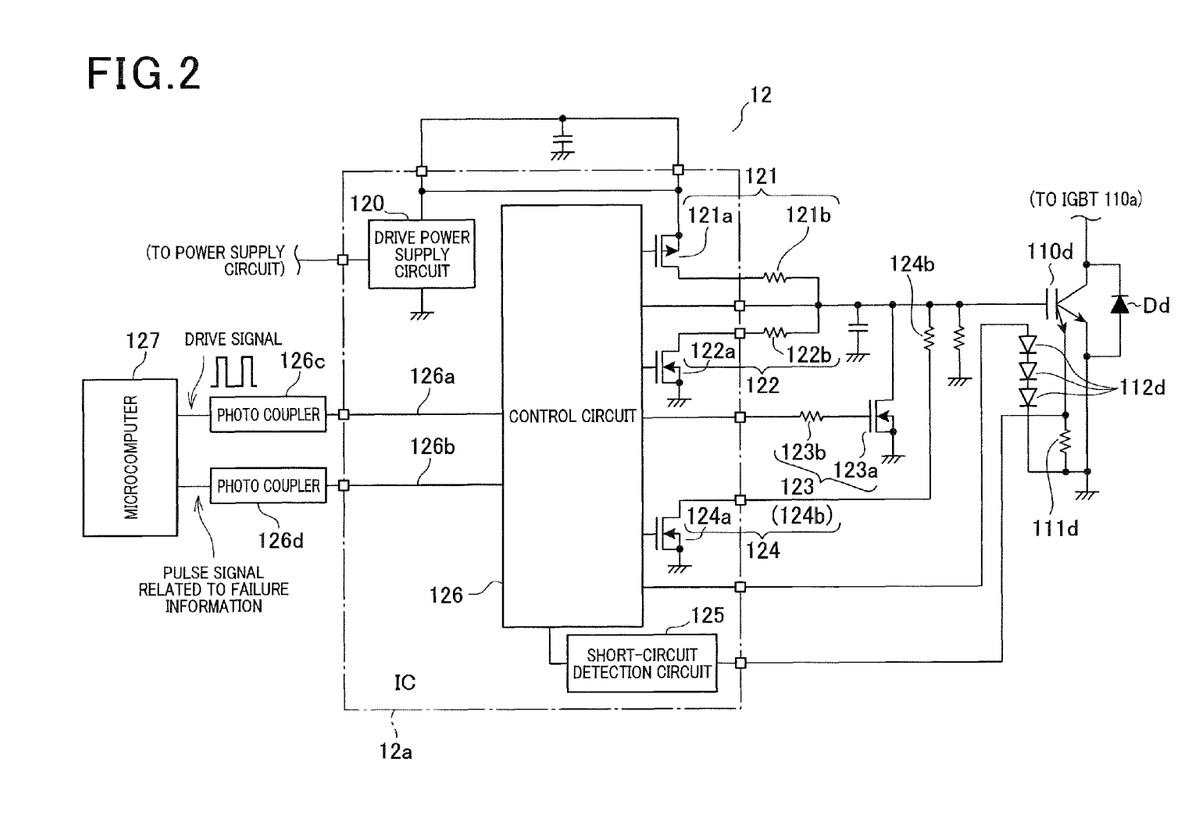
FIG. 2 is a circuit diagram of a control apparatus shown in FIG. 1.

With reference to FIG. 2, the controller is described in detail. FIG. 2 shows a circuit diagram of the controller 12 shown in FIG. 1, and particularly shows a circuit part of the controller 12 with respect to one IGBT (the IGBT 110d in FIG. 1).

As shown in FIG. 2, with respect to the IGBT 110d, the controller 12 includes a drive power supply circuit 120, an on-drive circuit 121, an off-drive circuit 122, an off-hold circuit 123, a shutdown circuit 124, a short-circuit detection circuit 125, and a control circuit (transmission circuit) 126. With respect to the other IGBTs 110a, 110b, 110c, 110e and 110f, the controller 12 includes the same elements, i.e., the drive power supply circuit, on-drive circuit, off-drive circuit, off-hold circuit, shutdown circuit, short-circuit detection circuit, and control circuit. The controller 12 also includes a microcomputer (reception circuit) 127 with respect to the IGBTs 110a to 110E.

The drive power supply circuit 120 is a circuit that supplies voltage for driving the IGBT 110d, and stabilizes voltage supplied from a power supply circuit (not shown) and outputs the voltage stabilized. In terminals (input terminal, positive terminal, and negative terminal) of the drive power supply circuit 120, the input terminal is connected to the power supply circuit, the positive terminal is connected to the on-drive circuit 121 and the control circuit 126, and the negative terminal is connected to the ground for the high voltage battery insulated from the body of the vehicle and is connected via the ground for the high voltage battery to the emitter of the IGBT 110d.

The on-drive circuit 121 is a circuit that turns on the IGBT 110d, so that the gate of the IGBT 110d is charged with electric charge, which allows gate voltage to be higher than threshold voltage needed to turn on and off the IGBT 110d, and then the IGBT 110d is turned on. The on-drive circuit 121 includes an on-drive FET (field effect transistor) 121a and an on-drive resistor 121b.

The on-drive FET 121a is an element that is driven by a control of gate voltage and is turned on so that the gate of the IGBT 110d is charged with electric charge. Specifically, the on-drive FET 121a is a p-channel MOSFET (metal oxide semiconductor FET). In terminals (source, drain, and gate) of the on-drive FET 121a, the source is connected to the positive terminal of the drive power supply circuit 120, the drain is connected via the on-drive resistor 121b to the gate of the IGBT 110d, and the gate is connected the controller 126.

The off-drive circuit 122 is a circuit that turns off the IGBT 110d, so that electric charge is discharged from the gate of the IGBT 110d, which allows gate voltage to be lower than threshold voltage needed to turn on and off the IGBT 110d, and turns off the IGBT 110d. The off-drive circuit 122 includes an off-drive FET 122a and an off-drive resistor 122b.

The off-drive FET 122a is a switching element that is turned on to discharge electric charge from the gate of the IGBT 110d. Specifically, the off-drive FET 122a is an n-channel MOSFET. In terminals (source, drain, and gate) of the off-drive FET 122a, (i) the source is connected to the ground for the high voltage battery insulated from the body of the vehicle and is connected via the ground for the high voltage battery to the negative terminal of the drive power supply circuit 120 and the emitter of the IGBT 110d, (ii) the drain is connected via the off-drive resistor 122b to the gate of the IGBT 110d, and (iii) the gate is connected to the control circuit 126.

The off-hold circuit 123 is a circuit that holds an off-state of the IGBT 110d. Specifically, if the gate voltage of the IGBT 110d is equal to or less than an predetermined off-hold threshold voltage needed to hold an off-state of the IGBT 110d that is lower than a threshold voltage for turning on and off the IGBT 110d, electric charge is quickly discharged from the gate of the IGBT 110d compared to the off-drive circuit 122, which allows the gate voltage to be lower than the threshold voltage for turning on and off the IGBT 110d, so that an off-state of the IGBT 110d is held. The off-hold circuit 123 includes an off-hold FET 123a and a gate resistor 123b.

The off-hold FET 123a is a switching element that is driven by controlling the gate voltage and is turned on, so that electric charge is discharged from the gate of the IGBT 110d. Specifically, the off-hold FET 123a is an n-channel MOSFET. In terminals (source, drain, and gate) of the off-drive FET 123a, (i) the source is connected to the ground for the high voltage battery insulated from the body of the vehicle and is connected via the ground for the high voltage battery to the negative terminal of the drive power supply circuit 120 and the emitter of the IGBT 110d, (ii) the drain is connected to the gate of the IGBT 110d, and (iii) the gate is connected via the gate resistor 123b to the control circuit 126.

The shutdown circuit 124 is a circuit that if an abnormality occurs, turns off the IGBT 110d instead of the off-drive circuit 122. Particularly, if a short-circuit abnormality occurs, electric charge is slowly discharged from the gate of the IGBT 110d compared to the off-drive circuit 122, which allows gate voltage to be lower than a threshold voltage for turning on and off the IGBT 110d, so that the IGBT 110d is turned off, instead of the off-drive circuit 122. The shutdown circuit 124 includes a shutdown FET 124a and a shutdown resistor 124b.

The shutdown FET 124a is a switching element that is driven by a control of gate voltage and is turned on so that electric charge is discharged from the gate of the IGBT 110d. Specifically, the shutdown FET 124a is an n-channel MOSFET. In terminals (source, drain, gate) of the shutdown FET 124a, (i) the source is connected to the ground for the high voltage battery insulated from the body of the vehicle and is connected via the ground for the high voltage battery to the negative terminal of the drive power supply circuit 120 and the emitter of the IGBT 110d, (ii) the drain is connected via the shutdown resistor 124b to the gate of the IGBT 110d, and (iii) the gate is connected to the control circuit 126.

The short-circuit detection circuit 125 is a circuit that detects whether or not the IGBT 100d is in a short-circuit state. Specifically, if current flowing in the IGBT 110d becomes larger than a predetermined short-circuit current threshold, both of the IGBTs 110a and 110d are turned on, and therefore, the short-circuit detection circuit 125 judges that a short-circuit current flows in the IGBT 110d. In terminals (input and output terminals) of the short-circuit detection circuit 125, the input terminal is connected to one end of the current sense resistor 111d, and the output terminal is connected to the control circuit 126.

The control circuit 126 is a circuit that controls the on-drive circuit 121 and the off-drive circuit 122 based on drive signals outputted from the microcomputer 127 via one signal line 126a so that the IGBT 110d is driven, and also controls the off-hold circuit 123 based on gate voltage of the IGBT 110d so that an off-state of the IGBT 110d is held. If the IGBT 110d is in a short-circuit state, the control circuit 126 controls the shutdown circuit 124 instead of the off-drive circuit 122 so that the IGBT 110d is turned off. The control circuit 126 detects a plurality of failures and transmits a plurality of pieces of failure information as a plurality of pulse signals different from one another via one signal line (transmission path) 126b. Specifically, (i) an overheat of IC 12a which is configured to integrate the drive power supply circuit 120, the on-drive FET 121a, the off-drive FET 122a, the shutdown FET 124a, the short-circuit detection circuit 125 and the control circuit 126, (ii) a short-circuit or overheat of the IGBT 110d, (iii) a failure of the on-drive FET 121a, and (iv) a voltage abnormality of the power supply circuit or the drive power supply circuit 120 are detected, and then the corresponding failure information is transmitted as pulse signals.

The control circuit 126 is connected via the signal line 126a and a photo coupler 126c to the microcomputer 127, and is connected to the gates of the on-drive FET 121a and the off-drive FET 122a. The control circuit 126 is connected to the gate of the IGBT 110d, and is connected via the gate resistor 123b to the gate of the off-hold FET 123a. The control circuit 126 is connected to the output terminal of the short-circuit detection circuit 125 and the gate of the off-hold FET 123a, and is connected via the signal line 126b and a photo coupler 126d to the microcomputer 127.

The microcomputer 127 is an element that generates drive signals based on instructions (not shown) inputted from the outside and outputs the drive signals generated via one signal line 126a to the control circuit 126. The microcomputer 127 receives pulse signals transmitted via one signal line 126b from the control circuit 126 and identifies failure information based on the pulse signals received. The microcomputer 127 is connected via the signal line 126a and the photo coupler 126c to the control circuit 126, and is connected via the signal line 126b and the photo coupler 126d to the control circuit 126.

With reference to FIG. 1, an operation of the motor control apparatus is described. When an ignition switch (not shown) of the vehicle is turned on, the motor control apparatus 1 starts to operate. A DC high voltage from the high voltage battery B1 is smoothed by the smoothing condenser 10. The IGBTs 110a to 110f of the inverter 11 is controlled by the controller 12 based on instructions inputted from the outside. And then, the IGBTs 110a to 110f are turned on and off at a predetermined cycle. The DC high voltage smoothed by the smoothing condenser 10 is converted by the inverter 11 into a three-phase AC voltage and supplies the three-phase AC voltage converted to the vehicle drive motor M1. Thus, the vehicle drive motor M1 is controlled by the motor control apparatus 1.

With reference to FIG. 2, a drive operation of the IGBT is described. In the FIG. 2, drive signals are generated by the microcomputer 127 based on instructions inputted from the outside and outputs the drive signals generated via the photo coupler 126a to the control circuit 126. Then, the on-drive FET 121a and the off-drive FET 122a are controlled by the control circuit 126 based on the drive signal outputted from the microcomputer 127, and subsequently the IGBT 110d is driven. When the control circuit 126 is instructed by the drive signals so as to turn on the IGBT 110d, the off-drive FET 122a is controlled by the control circuit 126 to be turned off and the on-drive FET 121a is controlled by the control circuit 126 to be turned on. Thus, current flows from the drive power supply circuit 120 via the on-drive FET 121a and the on-drive resistor 121b to the gate of the IGBT 110d, and then electric charge is discharged from the gate of the IGBT 110d. As a result, gate voltage becomes higher than a predetermined threshold voltage needed to turn on and off the IGBT 110d, and then, the IGBT 110d is turned on.

On the other hand, when the control circuit 126 is instructed by the drive signals so as to turn off the IGBT 110d, the on-drive FET 121a is controlled by the control circuit 126 to be turned off and the off-drive FET 122a is controlled by the control circuit 126 to be turned on. Thus, current flows from the gate of the IGBT 110d through the off-drive resistor 122b and the off-drive FET 122a, and then electric charge is discharged from the gate of the IGBT 110d. As a result, gate voltage becomes lower than the predetermined threshold voltage needed to turn off the IGBT 110d, and then, the IGBT 110d is turned off.

Then, gate voltage becomes equal to or less than a predetermined threshold value needed to hold an off-state of the IGBT 110d that is lower than a threshold voltage needed to turn off the IGBT 110d, the off-hold FET 123a is turned on by the control circuit 126. Thus, current flows from the gate of the IGBT 110d through the off-hold FET 123a, and then electric charge is further discharged, so that an off-state of the IGBT 110d is held.

If current flowing in the IGBT 110d becomes larger than a predetermined short-circuit current threshold, the short-circuit detection circuit 125 judges that both of the IGBTs 110a and 110d are in a short-circuit state where the both are turned on. When it is judged that the IGBT 110d is in a short-circuit state, instead of the off-drive FET 122a, the shutdown FET 124a is turned on by the short-circuit detection circuit 125. Thus, electric charge is discharged from the gate of the IGBT 110d via the shutdown resistor 124b. As a result, the gate voltage slowly becomes lower than the predetermined threshold voltage needed to turn on and off the IGBT 110d, and then the IGBT 110d is turned off.

Figure 3:
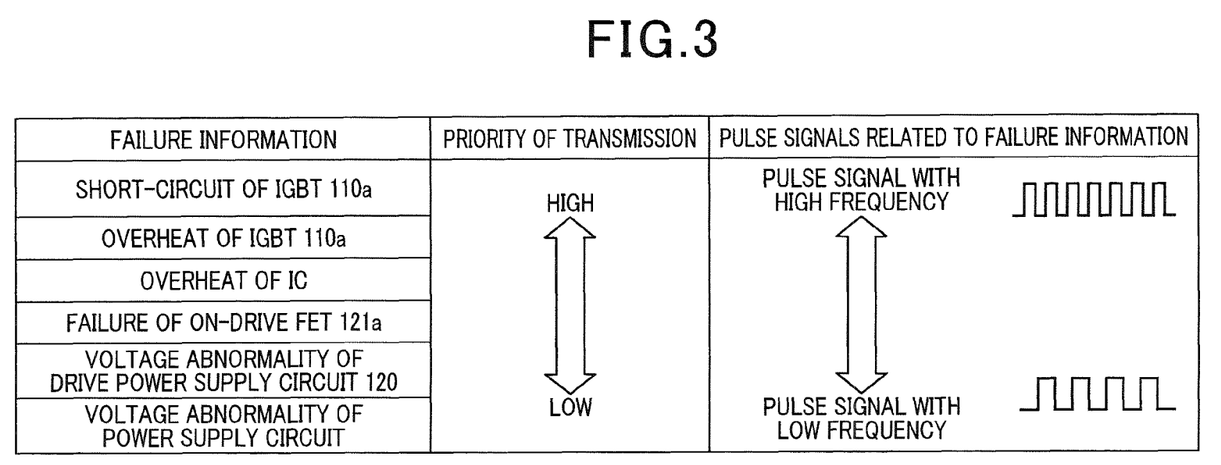
FIG. 3 is an explanation diagram for showing a relationship between pulse signals and a plurality of pieces of failure information according to the first embodiment.

Here, various failures other than (i) the short-circuit of the IGBT 110d is also detected by the control circuit 126. Particularly, (ii) an overheat of IC 12a which is configured to integrate the drive power supply circuit 120, the on-drive FET 121a, the off-drive FET 122a, the shutdown FET 124a, the short-circuit detection circuit 125 and the control circuit 126, (iii) a short-circuit or overheat of the IGBT 110d, (iv) a failure of the on-drive FET 121a, and (v) a voltage abnormality of the power supply circuit or the drive power supply circuit 120 are detected. And then, the corresponding plurality of pieces of failure information is transmitted as the different pulse signal. In the first embodiment, the plurality of pieces of failure information is transmitted as pulse signals different in frequency from one another in such a way that frequency of pulse signals becomes higher as priority of transmission of failure information becomes higher, as shown in FIG. 3. Here, failure information whose priority of transmission is high refers to information concerning failure which has high probability that the apparatus may be damaged by occurrence of the failure.

In the first embodiment, the priority of transmission is the highest in case of (i) the short-circuit of the IGBT 110d, and hereinafter, becomes lower in order of: (ii) the overheat of the IGBT 110d; (iii) the failure of the on-drive FET 121a; (iv) the voltage abnormality of the drive power supply circuit 120; and (v) the voltage abnormality of the power supply circuit. Along with this, the frequency of pulse signals transmitted is the highest in case of (i) the short-circuit of the IGBT 110d, and hereinafter, becomes lower in order of: (ii) the overheat of the IGBT 110d; (iii) the failure of the on-drive FET 121a; (iv) the voltage abnormality of the drive power supply circuit 120; and (v) the voltage abnormality of the power supply circuit. If a plurality of failures occurs at the same time, the control circuit 126 preferentially transmits failure information with higher priority of transmission first.

In the microcomputer 127 shown in FIG. 2, a relationship between pulse signals and failure information shown in FIG. 3 is set in advance, e.g., a memory (not shown). The microcomputer 127 receives pulse signals transmitted by the control circuit 126, and identifies failure information based on the pulse signals received, which performs an appropriate process based on the failure information identified.

The effects of the first embodiment are described below. According to the first embodiment, the control circuit 126 transmits a plurality of pieces of failure information as pulse signals different in frequency from one another via one signal line 126b. Then, the microcomputer 127 receives the pulse signals transmitted by the control circuit 126 via one signal line 126b, and identifies failure information based on the pulse signals received. If a plurality of failures occurs at the same time, the control circuit 126 preferentially transmits failure information with high priority of transmission. Hence, a plurality of pieces of failure information can be properly transmitted with a simple configuration.

According to the first embodiment, the control circuit 126 transmits a plurality of pieces of failure information as pulse signals different in frequency from one another. This allows the plurality of pieces of failure information to be transmitted as pulse signals different from one another.

According to the first embodiment, the control circuit 126 transmits a plurality of pieces of failure information as pulse signals which become higher in frequency as priority of transmission becomes higher. This enables the failure information with high priority of transmission to be more quickly transmitted.

(Second Embodiment)

Next, a motor control apparatus according to a second embodiment of the present invention will be described below. In comparison with the motor control apparatus according to the first embodiment that transmits the plurality of pieces of failure information as pulse signals different in frequency from one another, the motor control apparatus according to the second embodiment transmits the plurality of pieces of failure information as pulse signals different in the number of pulses from one another. The motor control apparatus according to the second embodiment is the same configuration as the motor control apparatus according to the first embodiment except for a configuration of pulse signals to be transmitted as the plurality of pieces of failure information.

Figure 4:
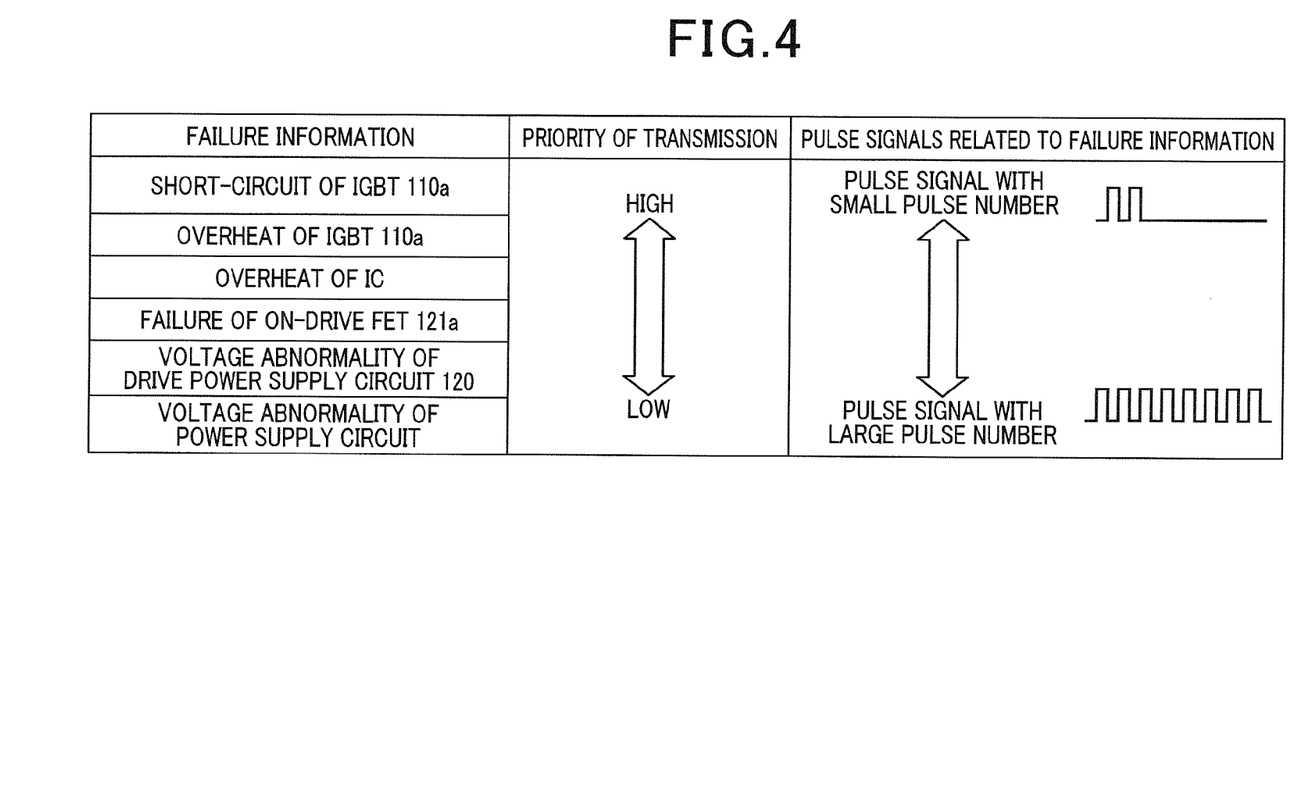
FIG. 4 is an explanation diagram for showing a relationship between pulse signals and a plurality of pieces of failure information according to a second embodiment of the present invention.

With reference to FIGS. 2 and 4, a transmission operation of failure information is described. FIG. 4 shows an explanation diagram for explaining pulse signals of failure information according to the second embodiment.

The control circuit 126 shown in FIG. 2 transmits a plurality of pieces of failure information as pulse signals different in the number of pulses from one another. Specifically, the control circuit 126 transmits a plurality of pieces of failure information as pulse signals which become smaller in the number of pulses as priority of transmission becomes higher, as shown in FIG. 4.

In the second embodiment, the priority of transmission is the highest in case of (i) the short-circuit of the IGBT 110d, and hereinafter, becomes lower in order of: (ii) the overheat of the IGBT 110d; (iii) the failure of the on-drive FET 121a; (iv) the voltage abnormality of the drive power supply circuit 120; and (v) the voltage abnormality of the power supply circuit. Along with this, the number of pulses of pulse signals transmitted is the smallest in case of (i) the short-circuit of the IGBT 110d, and hereinafter, becomes larger in order of: (ii) the overheat of the IGBT 110d; (iii) the failure of the on-drive FET 121a; (iv) the voltage abnormality of the drive power supply circuit 120; and (v) the voltage abnormality of the power supply circuit. If a plurality of failures occurs at the same time, the control circuit 126 preferentially transmits failure information with high priority of transmission.

The effects of the second embodiment are described below. According to the second embodiment, the control circuit 126 transmits a plurality of pieces of failure information as pulse signals different in the number of pulses from one another. This allows the plurality of pieces of failure information to be transmitted as pulse signals different from one another.

According to the second embodiment, the control circuit 126 transmits a plurality of pieces of failure information as pulse signals which become smaller in the number of pulses as priority of transmission becomes higher. This enables the failure information with high priority of transmission to be more quickly transmitted.

(Third Embodiment)

Next, a motor control apparatus according to a third embodiment of the present invention will be described below. In comparison with the motor control apparatus according to the first embodiment that transmits the plurality of pieces of failure information as pulse signals different in frequency from one another, the motor control apparatus according to the second embodiment transmits the plurality of pieces of failure information as pulse signals different in pulse width from one another. The motor control apparatus according to the third embodiment is the same configuration as the motor control apparatus according to the first embodiment except for a configuration of pulse signals to be transmitted as the plurality of pieces of failure information.

Figure 5:
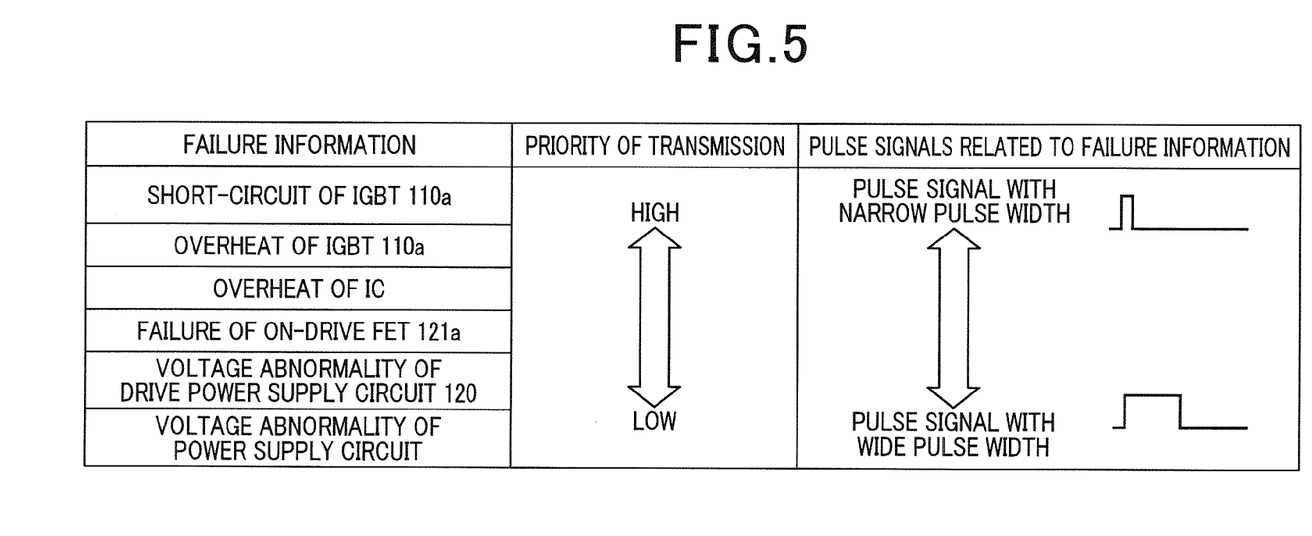
FIG. 5 is an explanation diagram for showing a relationship between pulse signals and a plurality of pieces of failure information according to a third embodiment of the present invention.

With reference to FIGS. 2 and 5, a transmission operation of failure information is described. FIG. 4 shows an explanation diagram for explaining pulse signals of failure information according to the third embodiment.

The control circuit 126 shown in FIG. 2 transmits a plurality of pieces of failure information as pulse signals different in pulse width from one another just one time. Specifically, the control circuit 126 transmits a plurality of pieces of failure information as pulse signals which become narrower in pulse width as priority of transmission becomes higher just one time, as shown in FIG. 5.

In the third embodiment, the priority of transmission is the highest in case of (i) the short-circuit of the IGBT 110d, and hereinafter, becomes lower in order of: (ii) the overheat of the IGBT 110d; (iii) the failure of the on-drive FET 121a; (iv) the voltage abnormality of the drive power supply circuit 120; and (v) the voltage abnormality of the power supply circuit. Along with this, pulse width of pulse signals transmitted is the narrowest in case of (i) the short-circuit of the IGBT 110d, and hereinafter, becomes wider in order of: (ii) the overheat of the IGBT 110d; (iii) the failure of the on-drive FET 121a; (iv) the voltage abnormality of the drive power supply circuit 120; and (v) the voltage abnormality of the power supply circuit. If a plurality of failures occurs at the same time, the control circuit 126 preferentially transmits failure information with high priority of transmission.

The effects of the third embodiment are described below. According to the third embodiment, the control circuit 126 transmits a plurality of pieces of failure information as pulse signals different in pulse width from one another. This allows the plurality of pieces of failure information to be transmitted as pulse signals different from one another.

According to the third embodiment, the control circuit 126 transmits a plurality of pieces of failure information as pulse signals which become narrower in pulse width as priority of transmission becomes higher. This enables the failure information with high priority of transmission to be more quickly transmitted.

(Fourth Embodiment)

Figure 6:
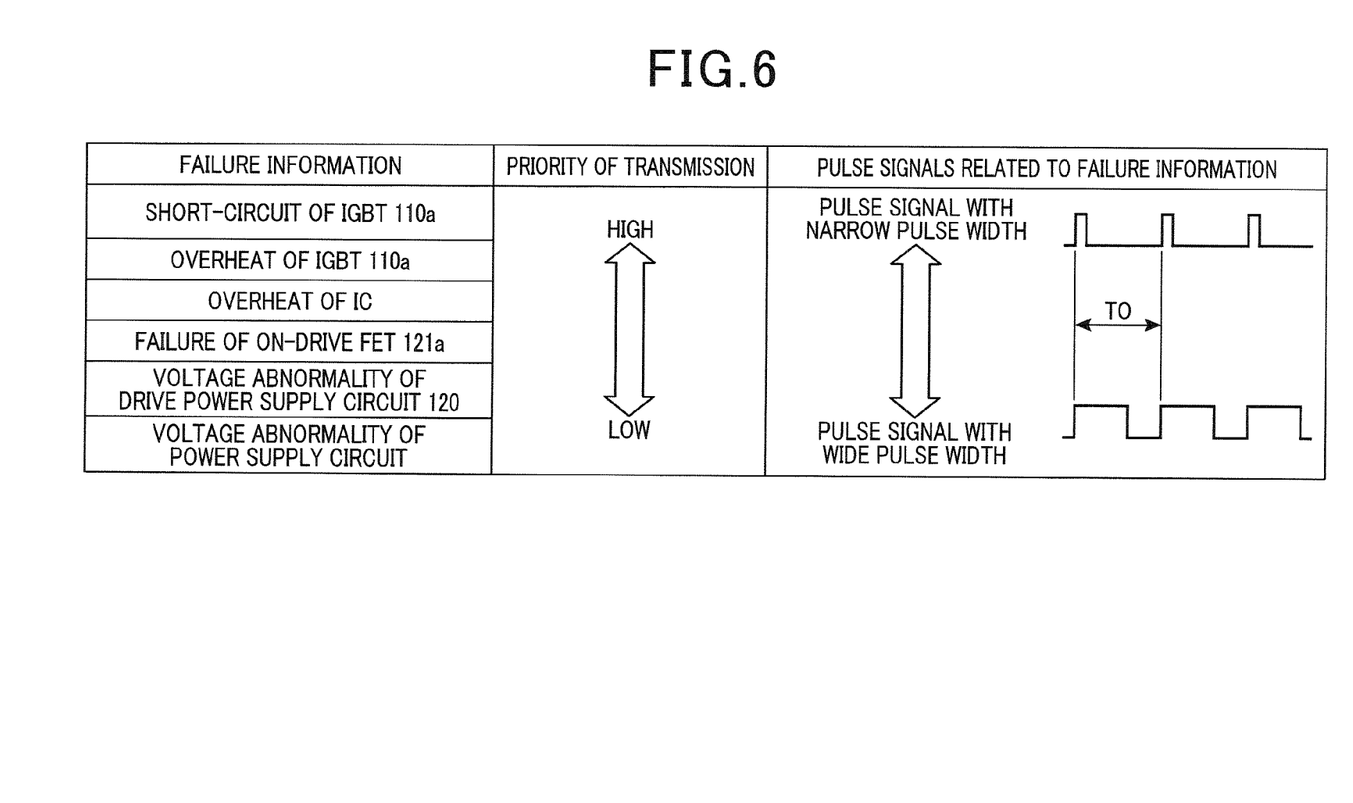
FIG. 6 is an explanation diagram for showing a relationship between pulse signals and a plurality of pieces of failure information according to a fourth embodiment of the present invention.

Next, a motor control apparatus according to a fourth embodiment of the present invention will be described below. In the third embodiment, the control circuit 126 transmits a plurality of pieces of failure information as pulse signals different in pulse width from one another just one time. The present invention is not limited to this configuration. For example, the motor control apparatus according to the fourth embodiment repeatedly transmits pulse signals related to failures at every time T0 (at every predetermined time interval) as shown in FIG. 6. This enables the microcomputer 127 to repeatedly identify pulse signals from the control circuit 126, which allows the failure information to be certainly identified.

The present invention may be embodied in several other forms without departing from the spirit thereof The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A failure information transmission apparatus, comprising:
    a transmission circuit that transmits a plurality of pieces of failure information related to a plurality of failures as pulse signals that are different from one another via the same transmission path; and
    a reception circuit that receives the pulse signals transmitted by the transmission circuit via the same transmission path and identifies the failure information based on the pulse signal received,
    wherein:

the transmission circuit transmits preferentially transmits the failure information with higher priority of transmission, if the plurality of failures occurs at the same time;

the transmission circuit transmits the plurality of pieces of failure information as pulse signals different in frequency from one another; and the transmission circuit transmits the plurality of pieces of failure information as pulse signals which become higher in frequency as priority of transmission becomes higher.

2. A failure information transmission apparatus, comprising:

a transmission circuit that transmits a plurality of pieces of failure information related to a plurality of failures as pulse signals that are different from one another via the same transmission path; and a reception circuit that receives the pulse signals transmitted by the transmission circuit via the same transmission path and identifies the failure information based on the pulse signal received, wherein:

the transmission circuit transmits preferentially transmits the failure information with higher priority of transmission, if the plurality of failures occurs at the same time;

the transmission circuit transmits the plurality of pieces of failure information as pulse signals different in the number of pulses from one another; and the transmission circuit transmits the plurality of pieces of failure information as pulse signals which become smaller in the number of pulses as priority of transmission becomes higher.

3. A failure information transmission apparatus, comprising:

a transmission circuit that transmits a plurality of pieces of failure information related to a plurality of failures as pulse signals that are different from one another via the same transmission path; and a reception circuit that receives the pulse signals transmitted by the transmission circuit via the same transmission path and identifies the failure information based on the pulse signal received, wherein:

the transmission circuit transmits preferentially transmits the failure information with higher priority of transmission, if the plurality of failures occurs at the same time; and the transmission circuit transmits the plurality of pieces of failure information as pulse signals different in pulse width from one another.

4. The failure information transmission apparatus according to claim 3, wherein the transmission circuit transmits the plurality of pieces of failure information as pulse signals which become narrower in pulse width as priority of transmission becomes higher.

5. The failure information transmission apparatus according to claim 3, wherein the transmission circuit transmits the pulse signals related to the plurality of failures in every predetermined time interval.

6. A failure information transmission apparatus, comprising:

a transmission circuit that transmits a plurality of pieces of failure information related to a plurality of failures as pulse signals that are different from one another via the same transmission path; and a reception circuit that receives the pulse signals transmitted by the transmission circuit via the same transmission path and identifies the failure information based on the pulse signal received, wherein:

the transmission circuit transmits preferentially transmits the failure information with higher priority of transmission, if the plurality of failures occurs at the same time;

the motor control apparatus is mounted on a vehicle and controls a motor for driving the vehicle;

the transmission circuit and the reception circuit are placed in the motor control apparatus; and the motor control apparatus includes:

a smoothing condenser that smoothes a direct current (DC) high voltage from a high voltage battery;

an inverter that includes a plurality of switching elements that are driven by a control of gate voltage, which converts the DC high voltage smoothed by the smoothing condenser to three-phase alternating current (AC) voltage, and which supplies the three-phase AC voltage to the motor; and a controller that controls the switching elements and includes a drive power supply circuit that supplies voltage for driving the switching elements and stabilizes voltage supplied from a power supply circuit and outputs the voltage stabilized, an on-drive circuit that turns on the switching elements, an off-drive circuit that turns off the switching elements, an off-hold circuit that holds an off-state of the switching elements, a shutdown circuit that turns off the switching elements if an abnormality occurs, a short-circuit detection circuit that detects whether or not the switching elements, a control circuit that controls the on-drive circuit and the off-drive circuit based on received drive signals so that the switching elements are driven, which controls the off-hold circuit based on gate voltage of the switching elements so that an off-state of the switching elements is held, and which controls the shutdown circuit so that the switching elements are turned off if the switching elements are in a short-circuit state, and a microcomputer that generates the drive signals based on an inputted instructions and outputs the signals generated via to the control circuit, wherein the transmission circuit is located in the control circuit detecting the plurality of failures including at least one of a short-circuit of the switching elements, an overheat of the switching elements, a failure of the on-drive circuit, and a voltage abnormality of the drive power supply circuit or the power supply circuit, which transmits a plurality of pieces of failure information related to the plurality of failures as pulse signals different from one another via the same transmission path, and which transmits preferentially transmits the failure information with higher priority of transmission, if the plurality of failures occurs at the same time, and the reception circuit is located in the microcomputer that receives the pulse signals transmitted via the same transmission path from the control circuit, and (iv) identifies the failure information based on the pulse signals received.

7. A motor control apparatus, comprising:

a smoothing condenser that smoothes a direct current (DC) high voltage from a high voltage battery;

an inverter that includes a plurality of switching elements that are driven by a control of gate voltage, which converts the DC high voltage smoothed by the smoothing condenser to three-phase alternating current (AC) voltage, and which supplies the three-phase AC voltage converted to the motor; and a controller that controls the switching elements and includes a drive power supply circuit that supplies voltage for driving the switching elements and stabilizes voltage supplied from a power supply circuit and outputs the voltage stabilized, an on-drive circuit that turns on the switching elements, an off-drive circuit that turns off the switching elements, an off-hold circuit that holds an off-state of the switching elements, a shutdown circuit that turns off the switching elements if an abnormality occurs, a short-circuit detection circuit that detects whether or not the switching elements, a control circuit that controls the on-drive circuit and the off-drive circuit based on received drive signals so that the switching elements are driven, which controls the off-hold circuit based on gate voltage of the switching elements so that an off-state of the switching elements is held, and which controls the shutdown circuit so that the switching elements are turned off if the switching elements are in a short-circuit state, and a microcomputer that generates the drive signals based on an inputted instructions and outputs the signals generated via to the control circuit, wherein the control circuit detects a plurality of failures including at least one of a short-circuit of the switching elements, an overheat of the switching elements, a failure of the on-drive circuit, and a voltage abnormality of the drive power supply circuit or the power supply circuit, and that transmits a plurality of pieces of failure information related to the plurality of failures as pulse signals different from one another via the same transmission path, the microcomputer receives the pulse signals transmitted via the same transmission path from the control circuit, and identifies the failure information based on the pulse signals received, and the control circuit transmits preferentially transmits the failure information with higher priority of transmission, if the plurality of failures occurs at the same time.

8. A motor system for a vehicle, comprising:

a motor that is mounted on the vehicle and drives the vehicle; and a motor control apparatus that controls the motor and includes:

a smoothing condenser that smoothes a direct current (DC) high voltage from a high voltage battery;

an inverter that includes a plurality of switching elements that are driven by a control of gate voltage, which converts the DC high voltage smoothed by the smoothing condenser to three-phase alternating current (AC) voltage, and which supplies the three-phase AC voltage converted to the motor; and a controller that controls the switching elements and includes a drive power supply circuit that supplies voltage for driving the switching elements and stabilizes voltage supplied from a power supply circuit and outputs the voltage stabilized, an on-drive circuit that turns on the switching elements, an off-drive circuit that turns off the switching elements, an off-hold circuit that holds an off-state of the switching elements, a shutdown circuit that turns off the switching elements if an abnormality occurs, a short-circuit detection circuit that detects whether or not the switching elements, a control circuit that controls the on-drive circuit and the off-drive circuit based on received drive signals so that the switching elements are driven, which controls the off-hold circuit based on gate voltage of the switching elements so that an off-state of the switching elements is held, and which controls the shutdown circuit so that the switching elements are turned off if the switching elements are in a short-circuit state, and a microcomputer that generates the drive signals based on an inputted instructions and outputs the signals generated via to the control circuit, wherein the control circuit detects a plurality of failures including at least one of a short-circuit of the switching elements, an overheat of the switching elements, a failure of the on-drive circuit, and a voltage abnormality of the drive power supply circuit or the power supply circuit, and that transmits a plurality of pieces of failure information related to the plurality of failures as pulse signals different from one another via the same transmission path, the microcomputer receives the pulse signals transmitted via the same transmission path from the control circuit, and identifies the failure information based on the pulse signals received, and the control circuit transmits preferentially transmits the failure information with high priority of transmission, if the plurality of failures occurs at the same time.

* * * * *